(No Model.)
J. R. SIMMS.
VEHICLE.
No. 545,136. Patented Aug. 27, 1895.
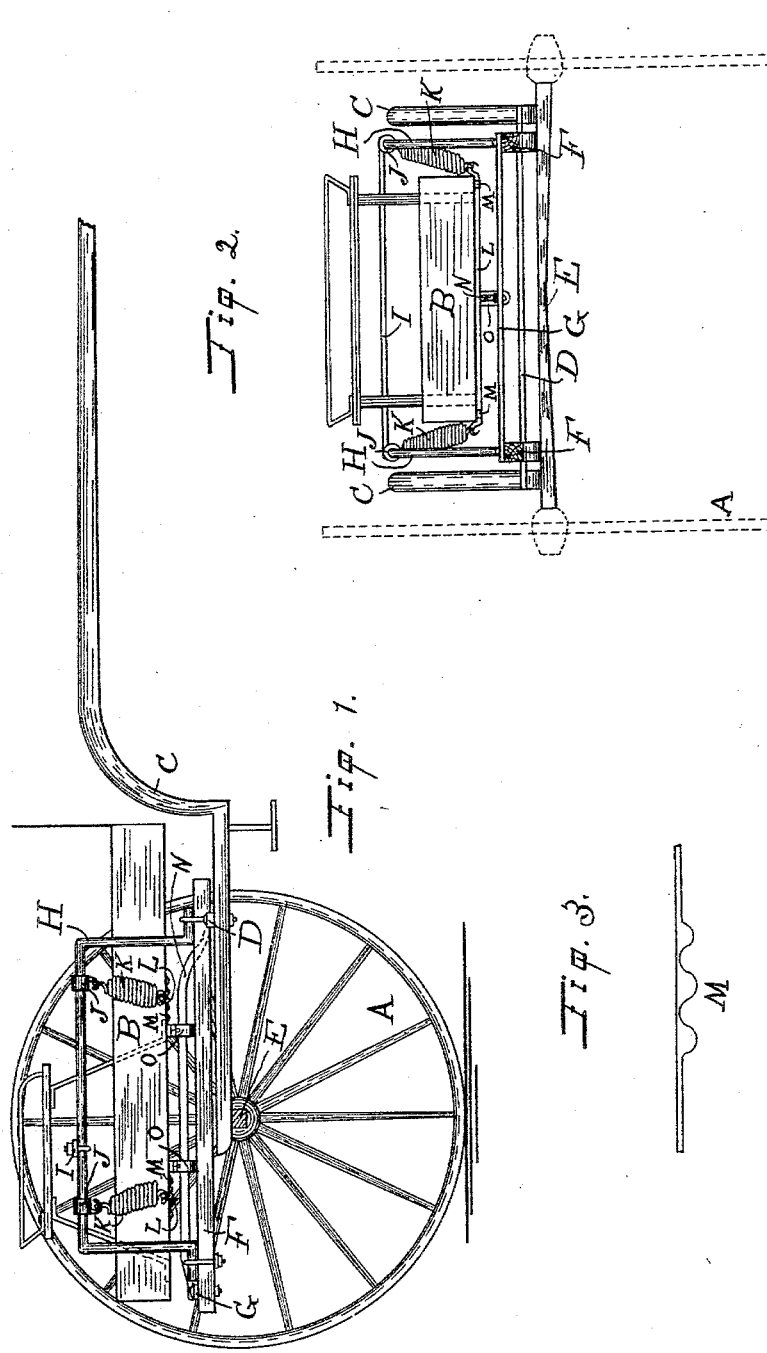
Witnesses
Molby Haynes
L. B. Hodge
Inventor
John R. Simms
By Joshua B. Webster
Attorney

UNITED STATES PATENT OFFICE.

JOHN R. SIMMS, OF MILTON, CALIFORNIA.

VEHICLE.

SPECIFICATION forming part of Letters Patent No. 545,136, dated August 27, 1895.

Application filed May 13, 1895. Serial No. 549,213. (No model.)

*To all whom it may concern:*

Be it known that I, JOHN R. SIMMS, a citizen of the United States, residing at Milton, in the county of Calaveras and State of California, have invented certain new and useful Improvements in Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to furnish a vehicle that shall be not only simple in construction and convenient in use, but also easy riding and free from the oscillating motion usually found in vehicles of this class and inexpensive to repair.

It consists in the peculiar construction, novel combination, and adaptation of parts, hereinafter described, and specifically pointed out in the claim appended.

Referring to the accompanying drawings, Figure 1 represents a right-hand side elevation of a two-wheeled vehicle having my improvement mounted thereon. Fig. 2 represents a rear elevation of the same. Fig. 3 represents a detached view of one of the corrugated adjusting-racks.

Similar letters of reference indicate corresponding parts throughout the several views.

A are the wheels, B is the body, and C is the shafts. The shafts C are suitably connected together in front of the axle E by means of a bar D, such shafts C being rigidly attached at their rear ends to the axle E.

A frame composed of longitudinal bars F and cross-bars G and D is rigidly attached to the axle E, such frame having greater rigidity imparted to it by means of the bar D engaging the bars F and the shafts C.

The bars F are provided with vertical frames H, which are rigidly attached to the bars F and are rendered more rigid by means of a cross-bar I, which connects such frames H at their tops.

The frames H are each provided with two hooks J, which are adjustably attached to and at the top of the frames H and are adapted to engage with spiral springs K, which are adapted to engage rock-shafts L, suitably mounted in corrugated racks M, rigidly mounted on the under side of the body B.

The body B being suspended by the spiral springs K, such body B is adapted to swing to and fro and is guarded from side motion by means of a guide-rail N, which is rigidly attached to the center of the cross-bars G and D, such guide-rail N being engaged by looped straps O, which are rigidly attached at intervals to the under side of the body B.

The seat is suitably mounted on the body B, near the rear end of the same.

As will be seen, when the running-gear is given a sudden jerk forward or backward, the body B is adapted to swing to and fro, thus relieving the rider from such jerk.

I have shown my invention mounted on a two-wheeled vehicle, but it may also be used on a four-wheeled vehicle.

By reason of the springs K being connected by hooks to the frames H it will be perceived that when worn or broken said springs may be readily disconnected from the hooks and may as readily be disconnected from the hooked ends of the rods L, which may then be readily removed from their seats in the connected bars M. It will also be observed that when the bars L are seated in the depressions of the plates M, directly below the hooks J, and there is too much spring for the convenience of those riding in the body B, the bars L may be changed to depressions in the plates M at a distance from the hooks J, so as to stretch the springs and enable them to hold the body more steady. In other words, by reason of the rods L being employed in conjunction with the corrugated plates M, the resiliency of the springs K may be quickly and easily regulated to suit the character of road that it is desired to travel over, which is an important desideratum.

I am aware that spiral springs have been used on vehicles of this class; therefore I do not claim that feature broadly; but

What I claim as new, and desire to secure by Letters Patent, is—

The vehicle described comprising the axle having wheels at its ends, the shafts fixedly connected to the axle, the transverse bar D, connecting the shafts in advance of the axle, the longitudinal bars F, connected to and extending in advance and rear of the axle and connected at their forward ends to the transverse bar D, the transverse bar G, connecting the rear ends of the bars F, the frames H, connected to and rising from the longitudinal bars F, a transverse bar I, connecting the upper portions of said frames, the longitudinal guide rail N, connected at its ends to the bars D, and G, at the middles thereof, the hooks J, connected with the horizontal bars of the frames H, the body B, having the corrugated plates M, on its under side, and also having loops O, on its under side engaging the guide rail N, the bars L, removably seated in the depressions of the corrugated plates M, and having hooks at their ends, and the springs K, connected with the hooks J, and the hooks of the bars L, all substantially as and for the purpose set forth.

In testimony whereof I affix my signature in presence of two witnesses.

JOHN R. SIMMS.

Witnesses:
MOLBRY HAYNES,
F. F. CARNDUFF.